US009157363B2

(12) United States Patent
Wade et al.

(10) Patent No.: US 9,157,363 B2
(45) Date of Patent: Oct. 13, 2015

(54) TWIN INDEPENDENT BOOSTED I4 ENGINE

(75) Inventors: Robert Andrew Wade, Dearborn, MI (US); John Christopher Riegger, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 498 days.

(21) Appl. No.: 13/591,057

(22) Filed: Aug. 21, 2012

(65) Prior Publication Data
US 2014/0053547 A1 Feb. 27, 2014

(51) Int. Cl.
| | |
|---|---|
| F02B 33/44 | (2006.01) |
| F02B 37/04 | (2006.01) |
| F01N 5/04 | (2006.01) |
| F01N 3/00 | (2006.01) |
| F02B 33/00 | (2006.01) |
| F02D 17/02 | (2006.01) |
| F02D 25/04 | (2006.01) |
| F02B 39/10 | (2006.01) |
| F02B 39/12 | (2006.01) |
| F02M 25/07 | (2006.01) |
| F02C 9/18 | (2006.01) |
| F02C 6/12 | (2006.01) |
| F01N 3/20 | (2006.01) |
| F01N 13/10 | (2010.01) |
| F02B 33/34 | (2006.01) |

(Continued)

(52) U.S. Cl.
CPC .............. *F02B 37/04* (2013.01); *F01N 3/2006* (2013.01); *F01N 13/105* (2013.01); *F01N 13/107* (2013.01); *F02B 33/34* (2013.01); *F02B 33/44* (2013.01); *F02B 39/10* (2013.01); *F02B 39/12* (2013.01); *F02C 6/12* (2013.01); *F02C 9/18* (2013.01); *F02M 25/07* (2013.01); *F02B 37/18* (2013.01); *F02D 41/0007* (2013.01); *F02F 1/243* (2013.01); *F05D 2220/40* (2013.01); *Y02T 10/144* (2013.01); *Y02T 10/26* (2013.01)

(58) Field of Classification Search
USPC ................... 60/611–612, 609, 280, 285, 277, 60/321–323; 123/562, 198 F
See application file for complete search history.

(56) References Cited

U.S. PATENT DOCUMENTS 4,406,126 A * 9/1983 Yokokura et al. ................ 60/280
4,409,949 A * 10/1983 Tanaka et al. ............... 123/198 F (Continued)

FOREIGN PATENT DOCUMENTS

| DE | 3312093 A1 * | 10/1984 | ............... F02B 37/02 |
|---|---|---|---|
| DE | 4127633 A1 * | 2/1993 | ................. F01N 7/10 |

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

An engine receiving boost from a supercharger and/or a turbocharger compressor is provided, along with methods for its operation. The engine may include inline cylinders arranged on an engine block and an integrated exhaust manifold (IEM), where exhaust flow from inner cylinders is kept separate from exhaust flow from outer cylinders within the IEM and where exhaust flow from the inner cylinders but not the outer cylinders flows through a turbine of the turbocharger. The supercharger and turbocharger compressor may be arranged in parallel upstream of an intake manifold of the engine, and throttles upstream of each of the supercharger and compressor may be controlled to direct intake air through one or both of the supercharger and the compressor based on engine operating conditions.

18 Claims, 5 Drawing Sheets

(51) Int. Cl.
  *F02B 37/18* (2006.01)
  *F02D 41/00* (2006.01)
  *F02F 1/24* (2006.01)

(56) References Cited

U.S. PATENT DOCUMENTS

| | | | |
|---|---|---|---|
| 4,452,208 A * | 6/1984 | Merlini et al. | 123/198 F |
| 4,903,488 A | 2/1990 | Shibata | |
| 5,142,867 A | 9/1992 | Bergmann et al. | |
| 5,463,867 A * | 11/1995 | Ruetz | 60/323 |
| 5,572,972 A | 11/1996 | Sheridan et al. | |
| 6,158,218 A * | 12/2000 | Herold et al. | 123/198 F |
| 6,185,938 B1 * | 2/2001 | Zander et al. | 60/280 |
| 6,273,076 B1 | 8/2001 | Beck et al. | |
| 6,276,138 B1 * | 8/2001 | Welch | 123/198 F |
| 6,289,672 B1 * | 9/2001 | Katoh et al. | 60/285 |
| 6,516,612 B1 * | 2/2003 | Okada et al. | 60/301 |
| 6,694,726 B2 * | 2/2004 | Sakai | 60/277 |
| 6,722,129 B2 | 4/2004 | Criddle et al. | |
| 6,868,669 B2 * | 3/2005 | Tanaka | 60/277 |
| 6,874,463 B1 * | 4/2005 | Bolander et al. | 123/198 F |
| 7,165,403 B2 * | 1/2007 | Sun et al. | 60/612 |
| 7,343,902 B2 * | 3/2008 | Brevick et al. | 123/198 F |
| 7,753,037 B2 | 7/2010 | Hatamura | |
| 7,753,039 B2 * | 7/2010 | Harima et al. | 123/676 |
| 7,757,489 B2 * | 7/2010 | Endres et al. | 60/612 |
| 7,882,820 B2 * | 2/2011 | Irisawa | 123/198 F |
| 8,015,799 B2 * | 9/2011 | Tamura et al. | 60/323 |
| 8,056,337 B2 * | 11/2011 | Hokuto et al. | 60/602 |
| 8,061,131 B2 * | 11/2011 | Kuhlbach | 60/323 |
| 8,141,361 B2 * | 3/2012 | Andersen | 60/611 |
| 8,209,109 B2 * | 6/2012 | Storhok et al. | 701/105 |
| 8,220,264 B2 * | 7/2012 | Arvan et al. | 60/605.1 |
| 8,341,953 B2 * | 1/2013 | Murakami et al. | 60/323 |
| 8,359,846 B2 * | 1/2013 | Murakami et al. | 60/323 |
| 8,899,040 B2 * | 12/2014 | Vijayaraghavan et al. | 60/614 |
| 2004/0011037 A1 | 1/2004 | Zimmer et al. | |
| 2004/0194465 A1 | 10/2004 | Bolz et al. | |
| 2007/0056281 A1 * | 3/2007 | Arvan et al. | 60/605.1 |
| 2008/0011278 A1 | 1/2008 | Yamagata | |
| 2008/0016864 A1 * | 1/2008 | Andersen | 60/602 |
| 2008/0307788 A1 * | 12/2008 | Hokuto | 60/302 |
| 2009/0038293 A1 * | 2/2009 | Miyashita | 60/598 |
| 2010/0083656 A1 | 4/2010 | Parlow et al. | |
| 2010/0083920 A1 | 4/2010 | Kuhlbach | |
| 2010/0095672 A1 | 4/2010 | An | |
| 2010/0263375 A1 | 10/2010 | Grieve | |
| 2011/0094480 A1 | 4/2011 | Suhocki et al. | |

FOREIGN PATENT DOCUMENTS

| | | | | |
|---|---|---|---|---|
| DE | 102010018087 A1 * | 10/2011 | | F02B 37/18 |
| EP | 369189 A1 * | 5/1990 | | F02B 37/04 |
| EP | 2256314 A1 * | 12/2010 | | F02B 67/10 |
| JP | 58222919 A * | 12/1983 | | F02B 37/04 |
| JP | 61190123 A * | 8/1986 | | F02B 37/04 |
| JP | 61205332 A * | 9/1986 | | F02B 37/04 |
| JP | 63297733 A * | 12/1988 | | F02B 37/04 |
| JP | 05141255 A * | 6/1993 | | F02B 37/02 |
| JP | 05141256 A * | 6/1993 | | F02B 37/02 |
| JP | 2005054612 A | 3/2005 | | |
| WO | 2008078020 A1 | 7/2008 | | |

* cited by examiner

TWIN INDEPENDENT BOOSTED I4 ENGINE

BACKGROUND AND SUMMARY

Vehicle internal combustion engines may incorporate turbochargers to boost engine torque output. For example, engines which have been downsized for improved fuel economy may require boost to compensate for the loss in engine power resulting from the downsizing, and may obtain such boost via a turbocharger (e.g., the turbocharger may provide boost by creating forced induction of intake air and thereby improving engine torque output). However, various disadvantages may be associated with using a turbocharger alone. In the case of downsized engines, incorporation of a turbocharger may limit the extent the engine can be downsized as it may not be possible to provide a desired pressure ratio or transient behavior over the full operating range of the engine with a turbocharger alone. Further, more generally, turbochargers may have a slow transient response, which may result in undesirable lag in engine torque output.

Furthermore, when exhaust flowing from multiple engine cylinders is directed to an inlet of the turbocharger turbine, undesirable cross-talk may between the cylinders depending on the firing order and cam timing of the cylinders, which may interfere with combustion. As one example of undesirable cylinder cross-talk in a turbocharged engine, a turbocharged four-cylinder engine may have a 1-3-4-2 firing order, where cylinders 1 and 4 are outer cylinders of the engine block and cylinders 2 and 3 are inner cylinders of the engine block. Communication between the outer cylinders and inner cylinders may occur upstream of the turbine of the turbocharger. For example, late in the exhaust blow-down event for cylinder 1, cylinder 3 may start to blow down which may increase the pressure and temperature of gas trapped in cylinder 1 and may increase residual content in that cylinder. As a result, combustion may be negatively affected, there may be an increased propensity for knock, and more boost may be required to achieve a desired engine power output. These issues may ultimately limit the power capability of the engine.

Various approaches may be used to address the above issues. To address turbocharger lag, some approaches incorporate a supercharger to provide boost along with the turbocharger, where one or both of the devices may be used at a given time. For example, US 2010/0263375 describes a boost system comprising a turbocharger and a supercharger operable as either a compressor or an expander. At lower engine speeds, the supercharger provides boost, and at higher engine speeds (e.g., relative to the lower engine speeds), the turbocharger provides boost while the supercharger operates as an expander to provide cooling. In this approach, exhaust from all engine cylinders is directed through the turbocharger turbine. As such, this approach may suffer from cylinder crosstalk, which may negatively affect engine combustion.

To address cylinder cross-talk, some approaches may incorporate a twin-scroll turbocharger. Twin-scroll turbochargers address cylinder cross-talk by providing two exhaust paths for cylinders whose exhaust pulses may interfere with each other, each path leading to a different turbine. For example, in a four-cylinder engine with a firing sequence of 1-3-4-2, exhaust valve overlap may occur between cylinders 1 and 2 during the expansion stroke of cylinder 1. However, because the twin-scroll turbocharger provides separate exhaust paths for cylinders 1 and 2, the exhaust pulse from cylinder does not interfere with combustion in cylinder 2. Further, because such valve overlap does not have a negative effect on combustion, cam duration may be increased, thereby decreasing engine pumping work and increasing fuel efficiency. Despite these advantages, the inventors have identified various issues with the twin-scroll turbocharger approach. Twin-scroll turbochargers may be relatively expensive and may have low durability due to their complex structure relative to a single turbocharger. Further, their functionality may be comprised at high temperatures.

The inventors herein have recognized that incorporating a supercharger in an engine system to address transient response issues or replacing a turbocharger with a twin-scroll turbocharger to address cylinder cross-talk issues may not produce satisfactory results, and may even introduce further issues such as those described above. In contrast with the above approaches, the inventors herein have identified an engine system and associated methods for providing boost via one or both of a turbocharger and supercharger, thereby avoiding a slow transient response, where exhaust from only a subset of engine cylinders flow through the turbocharger turbine so as to avoid cylinder cross-talk. In accordance with one example method, exhaust from only a first subset of cylinders may be directed to a turbine of a turbocharger via an IEM, exhaust from only a second subset of cylinders may be directed to bypass the turbine via the IEM, and intake air may be compressed via one or both of a supercharger and a compressor of the turbocharger. In this way, by only directing exhaust from a subset of engine cylinders through the turbine, communication will not occur between cylinders of the different subsets even when exhaust valve openings of the cylinders overlap (which may occur depending on the firing sequence of the cylinders). Accordingly, cam duration may be increased, thereby decreasing pumping work and increasing fuel efficiency. Because exhaust from the second subset of cylinders does not flow through the turbine, this exhaust may flow through a close-coupled catalyst, thereby reducing catalyst light-off times which may improve engine emissions. Also, because the use of an IEM may be compatible with this engine system, turbocharger housing material costs may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
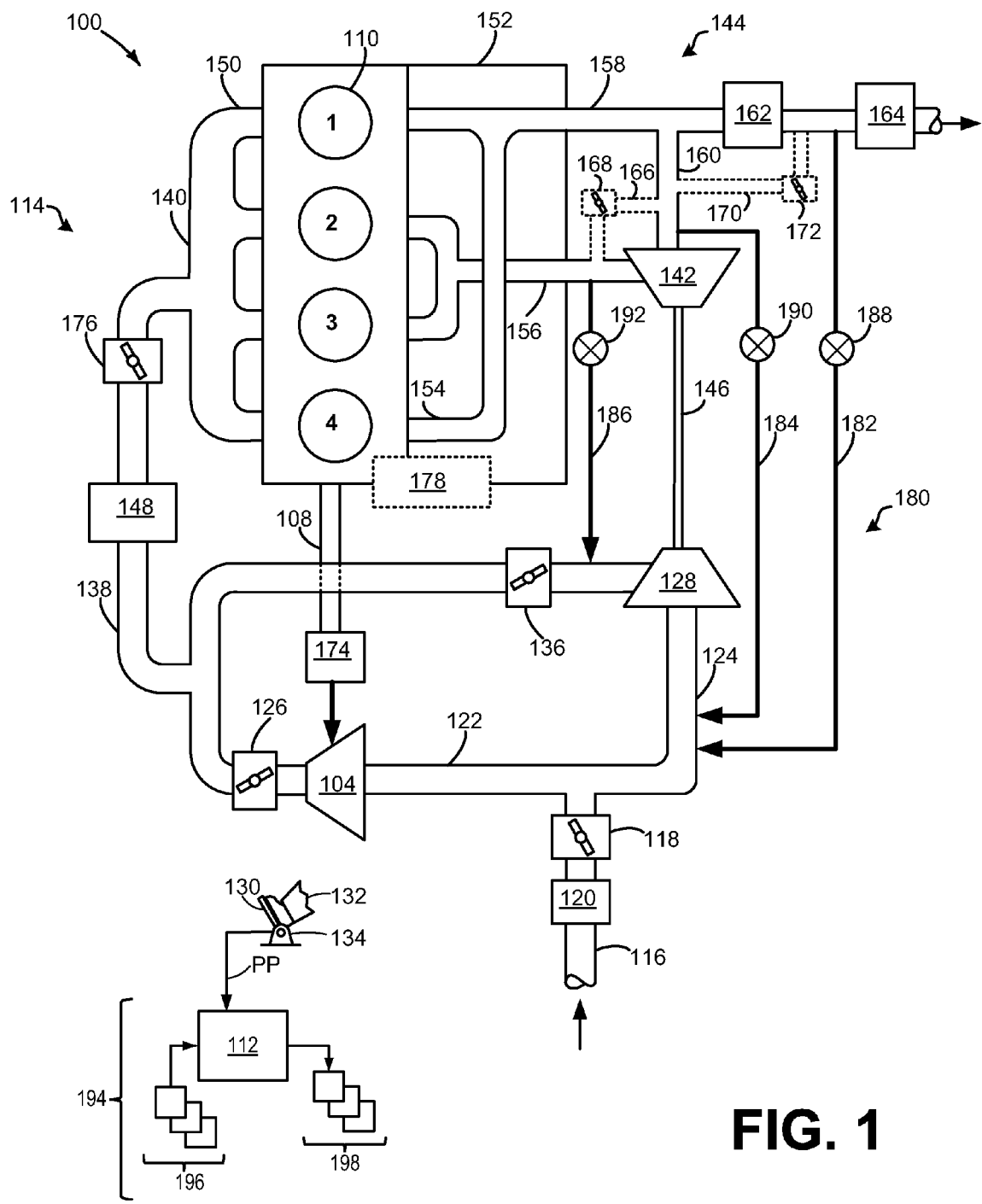
FIG. 1 schematically shows an example embodiment of a twin independent boosted 14 engine including a turbocharger and a supercharger.

The following description relates to methods and systems for boosting an internal combustion engine via one or both of a supercharger and turbocharger. As shown in FIG. 1, an engine system may include a supercharger plumbed in parallel with a turbocharger upstream of an intake manifold, with valves for control over the intake air flow path. The system may further include an integrated exhaust manifold in which exhaust from a first subset of cylinders is routed in a first plenum, whereas exhaust from a second subset of cylinders is routed in a second plenum. The first and second plenums may not communicate with each other within the IEM, the first plenum may communicate with a turbine inlet whereas the second plenum may not communicate with first plenum or the turbine inlet. The methods described herein may be used in conjunction with such an engine system to achieve the advantages associated with use of a turbocharger while avoiding disadvantages such as slow transient response (via boost assistance from the supercharger) and cylinder cross-talk (by routing exhaust from cylinders adjacent in the cylinder firing sequence in separate plenums which do not communicate with each other).

Compression via one or both of a supercharger and a turbocharger compressor as described herein may be referred to as a "boost separated strategy", and this strategy may achieve many advantages. By incorporating a supercharger in the system, it may be possible to provide instantaneous boost during a wide range of engine operating conditions including transient conditions such as driver tip-in, thereby resolving transient response problems associated with the use of a turbocharger alone. Put another way, the "torque knee" may be achieved with the supercharger; a pulley ratio and supercharger displacement may be selected to give a lower-speed torque knee, whereas the turbocharger may be sized to deliver the required boost during peak power conditions. This strategy may result in a wider torque curve relation to a conventional turbocharged engine. Further, addition of the supercharger to the system also enables downsizing of the turbocharger, such that the turbocharger may be sized for a two-cylinder engine rather than a four-cylinder engine which provides cost advantages and frees up space in the engine compartment. Furthermore, regardless of whether boost is provided by the turbocharger alone, the supercharger and turbocharger together, or the supercharger alone, the engine system may be capable of handling exhaust gas at 1050° C., thereby improving fuel economy and emissions compliance. For example, the use of high-temperature materials in the turbine housing may allow for a better $\lambda=1$ line, and may enable the exhaust route to catalyst(s) in the emission control system to run hot. Moreover, during compressor surge conditions, the engine system may be controlled to divert intake air flow to the supercharger temporarily until the surge condition has resolved. Finally, during high engine output operation, the supercharger may be decoupled from the engine crankshaft and intake air may not flow through the supercharger, which may reduce the crankshaft work load and thereby improve power output and engine durability.

FIG. 1 schematically depicts an engine system 100 which may be included in a propulsion system of an automobile. Engine system 100 is a multi-cylinder engine. As detailed below, a turbocharger 102 and a supercharger 104 are included in the engine to individually or cooperatively provide boost to the engine depending on operating conditions. In the embodiments described herein, engine system 100 is an inline four (I4) engine with four cylinders 110 arranged in an engine block 106.

Engine block 106 includes crankshaft 108 and four cylinders 110. The four cylinders 110 are labeled 1, 2, 3, and 4, respectively, where cylinders 1 and 4 are outer cylinders and cylinders 2 and 3 are inner cylinders (i.e., cylinders 2 and 3 are arranged adjacent to each other and between cylinders 1 and 4 on the engine block). Herein, inner cylinders 2 and 3 may be referred to as a first subset of cylinders, and outer cylinders 1 and 4 may be referred to as a second subset of cylinders, and the outer cylinders may be described as flanking the inner cylinders. While engine system 100 is an inline four engine with four cylinders, it will be appreciated that engine system 100 may include a different number of cylinders in other embodiments. Cylinders 110 may each include a spark plug and a fuel injector for delivering fuel directly to the combustion chamber. However, in alternate embodiments, each cylinder 110 may not include a spark plug and/or direct fuel injector.

Engine system 100 may be controlled at least partially by a control system 194. Control system 194 is shown receiving information from a plurality of sensors 196 and sending control signals to a plurality of actuators 198. Sensors 196 may include pressure, temperature, air/fuel ratio, and composition sensors, for example. Actuators 198 may include the electrically-controlled clutch, control valves, and throttles that will be described herein, for example. The control system 194 may include a controller 112. The controller may receive input data from various sensors, process the input data, and trigger various actuators in response to the processed input data based on instruction or code programmed therein corresponding to one or more routines. Further, controller 112 may receive input from a vehicle operator 132 via an input device 130. In this example, input device 130 includes an accelerator pedal and a pedal position sensor 134 for generating a proportional pedal position signal PP.

Engine system 100 includes an intake system 114. Ambient air flow can enter the intake system through first intake passage 116, wherein the flow rate of the intake air can be controlled at least in part by a first throttle 118. Accordingly, a position of the first throttle may be utilized as an engine operating parameter for controlling air flow in the engine. An air filter 120 may be arranged upstream of first throttle 118 in first intake passage 116 to remove solid particulate matter from intake air.

Downstream of first throttle 118, first intake passage 116 diverges into two parallel passages, supercharger passage 122 and compressor passage 124. Supercharger 104 and a supercharger throttle 126 downstream of supercharger 104 are arranged in supercharger passage 122. Similarly, a compressor 128 of turbocharger 102 and a compressor throttle 136 downstream of compressor 128 are arranged in compressor passage 124. The portion of compressor passage 124 that is upstream of compressor 128 may be referred to as a compressor inlet and the portion of compressor passage 124 that is downstream of compressor 128 may be referred to as a compressor outlet. Similarly, the portion of supercharger passage 122 that is upstream of supercharger 104 may be referred to as a supercharger inlet, and the portion of supercharger passage 122 that is downstream of supercharger 104 may be referred to as a supercharger outlet. The compressor outlet and the supercharger outlet merge downstream of compressor throttle 136 and supercharger throttle 126 into a second intake passage 138, which leads to intake manifold 140. Intake manifold 140 may be configured to supply intake air and/or fuel to the cylinders 110. As shown in FIG. 1, intake manifold 140 may branch into multiple intake runners 150, each intake runner fluidly communicating with one of cylinders 110. Each cylinder 110 may receive intake air from intake manifold 140 via the intake runner 150 coupled thereto. Each intake runner may selectively communicate with a corresponding cylinder 110 via one or more intake valves of that cylinder. In this way, air compressed by supercharger 104 and/or compressor 128 may communicate fluidly with cylinders 110 via intake manifold 140. Supercharger 104 and compressor 128 of turbocharger 102 may be configured to increase a mass of air entering at least one of the cylinders 110. In this way, the supercharger and compressor may control, at least in part, an amount of air flow in the engine system 100. An amount of compression provided to one or more of cylinders 110 via the turbocharger and/or supercharger may be varied by controller 112.

In the example embodiment shown in FIG. 1, it may be advantageous for the firing order of cylinders 110 to be 1-3-4-2. However, cylinders 110 may be fired in a different order without departing from the scope of this disclosure.

Compressor 128 of turbocharger 102 may be at least partially driven by a turbine 142 coupled in an exhaust system 144 of the engine via a shaft 146. The relatively simple design of turbocharger 102, for example relative to a twin-scroll turbocharger, may advantageously enable the use of high temperature materials for construction of the turbocharger. Supercharger 104 may be at least partially driven by the engine and/or an electric machine, and may not include a turbine. For example, as shown in FIG. 1, supercharger 104 may be connectable with crankshaft 108 of engine system 100 via an electronically-controlled clutch 174. Controller 112 may control clutch 174 to connect crankshaft 108 with supercharger 104 during conditions where supercharger compression of intake air is desired. When the supercharger is connected with the crankshaft via the clutch, the supercharger may be driven by the engine to compress intake air. Whereas the transient response time for turbocharger 102 may be greater than 1 second in some conditions, supercharger 104 may provide a 0.2 second response time across the engine speed range, for example. Advantageously, when supercharger compression of intake air is not desired, for example during conditions when the turbocharger alone is to be used for intake air compression, the supercharger may be disconnected from the crankshaft via the clutch such that the supercharger does not exert a load on the engine.

In the embodiment shown in FIG. 1, an intercooler 148 is arranged in second intake passage 138. Intercooler 148 may increase engine efficiency and reduce knock by reducing the temperature of intake air, which may be undesirably high during boost conditions where intake air is compressed by the supercharger and/or turbocharger.

Downstream of intercooler 148 in second intake passage 138, a second throttle 176 may be arranged to control the flow of intake air from the compressor and/or supercharger to the engine.

Exhaust system 144 of engine system 100 may include an integrated exhaust manifold (IEM) 152 configured to exhaust the combustion products from the cylinders 110. IEM 162 may include exhaust runners 154, and each exhaust runner may selectively communicate with a corresponding cylinder 110 via one or more exhaust valves of that cylinder (not shown). The exhaust runners coupled to cylinders 2 and 3, respectively, merge inside IEM 152 at a first plenum 156, and the exhaust runners coupled to cylinders 1 and 4, respectively, merge inside IEM 152 at a second plenum 158. The first and second plenums do not communicate, and similarly, the exhaust runners coupled to cylinders in different subsets do not communicate. As such, exhaust pulses from cylinders in different subsets may be completely separated, such that blowback from one cylinder may not harm combustion in another cylinder adjacent in the firing sequence.

IEM 152 may include a cooling system 178. Cooling system 178 may receive engine coolant from the engine and direct the coolant throughout the IEM. The coolant may be pumped by a coolant pump through the engine block, and then up to the IEM and through the IEM along one or more parallel and/or serial paths, before exiting the IEM and then being directed to a radiator.

First and second plenums 156 and 158 may extend outside of IEM 152. Outside of IEM 152, first plenum 156 routes exhaust from the first subset of cylinders (e.g., inner cylinders 2 and 3) through turbine 142 of turbocharger 102, whereas second plenum 158 routes engine exhaust from the second subset of cylinders (e.g., outer cylinders 1 and 4) directly to the one or more emission control devices which may be arranged in second plenum 158 for treating engine exhaust in the passage before it is released to ambient. Because exhaust flowing in the second plenum bypasses the turbine, pumping work in the two cylinders communicating with the second plenum may decrease, which may improve fuel efficiency. After passing through turbine 142, exhaust gases from the first plenum are routed to the second plenum upstream of the emission control devices via a turbine outlet passage 160. In the embodiment of FIG. 1, the one or more emission control devices include a close-coupled catalyst 162 and an underbody catalyst 164.

A turbine bypass passage 166 may optionally be included in the system to allow exhaust in first plenum 156 to bypass turbine 142, via control of a wastegate 168 arranged in the turbine bypass passage. Turbine bypass passage 166 may be coupled to first plenum 156 upstream of turbine 142, and to turbine outlet passage 160 so as to connect the two passages. When wastegate 168 is fully closed, all exhaust flow in first plenum 156 may be directed through turbine 142 and then through turbine outlet passage 160. When wastegate 168 is fully opened, substantially all exhaust flow in first plenum 156 may bypass turbine 142 and flow directly into the turbine outlet passage. In this way, the amount of exhaust gas bypassing the turbine may be controlled by adjusting waste gate 168.

A catalyst bypass passage 170 may also optionally be included in the system so that exhaust may bypass close-coupled catalyst 162. One end of catalyst bypass passage 170 may be coupled to turbine outlet passage 160 intermediate second plenum 158 and the juncture of turbine bypass passage 166 and turbine outlet passage 160. The other end of catalyst bypass passage 170 may be coupled to second plenum 158 intermediate the close-coupled catalyst and the underbody catalyst. A catalyst bypass throttle 172 may be arranged in the catalyst bypass passage. When catalyst bypass throttle 172 is in a fully open state, exhaust in the turbine outlet passage may flow through catalyst bypass passage, and thereby bypass the close-coupled catalyst. In contrast, when catalyst bypass throttle 172 is in a fully closed state, exhaust in the turbine outlet passage may flow through the turbine outlet passage into second plenum 158 upstream of close-coupled catalyst 162. In some embodiments, an opening degree of catalyst bypass throttle may be controlled such that a desired proportion of the exhaust in the turbine outlet passage bypasses the close-coupled catalyst, while the remainder of the exhaust continues in the turbine outlet passage and flows through the close-coupled catalyst.

As shown in FIG. 1, an exhaust gas recirculation (EGR) system 180 may route a desired portion of exhaust gas from the exhaust system to the intake system via various EGR passages. A first EGR passage 182 may couple second plenum 158 to compressor passage 124 upstream of compressor 128. A second EGR passage 184 may couple turbine outlet passage 160 to compressor passage 124 upstream of compressor 128. A third EGR passage 186 may couple first plenum 156 to compressor passage 124 downstream of compressor 128. First EGR passage 182 may include a first EGR valve 188, second EGR passage 184 may include a second EGR valve 190, and third EGR passage 186 may include a third EGR valve 192. The amount of EGR provided to intake system 114 may be varied by controller 112 via the first, second, and third EGR valves. Optionally, EGR sensors may be arranged within the EGR passages and may provide an indication of one or more pressure, temperature, and concentration of the exhaust gas in each passage. EGR system 180 may advantageously decrease NOx emissions by recirculating a portion of engine exhaust back to intake system 114.

Figure 2:
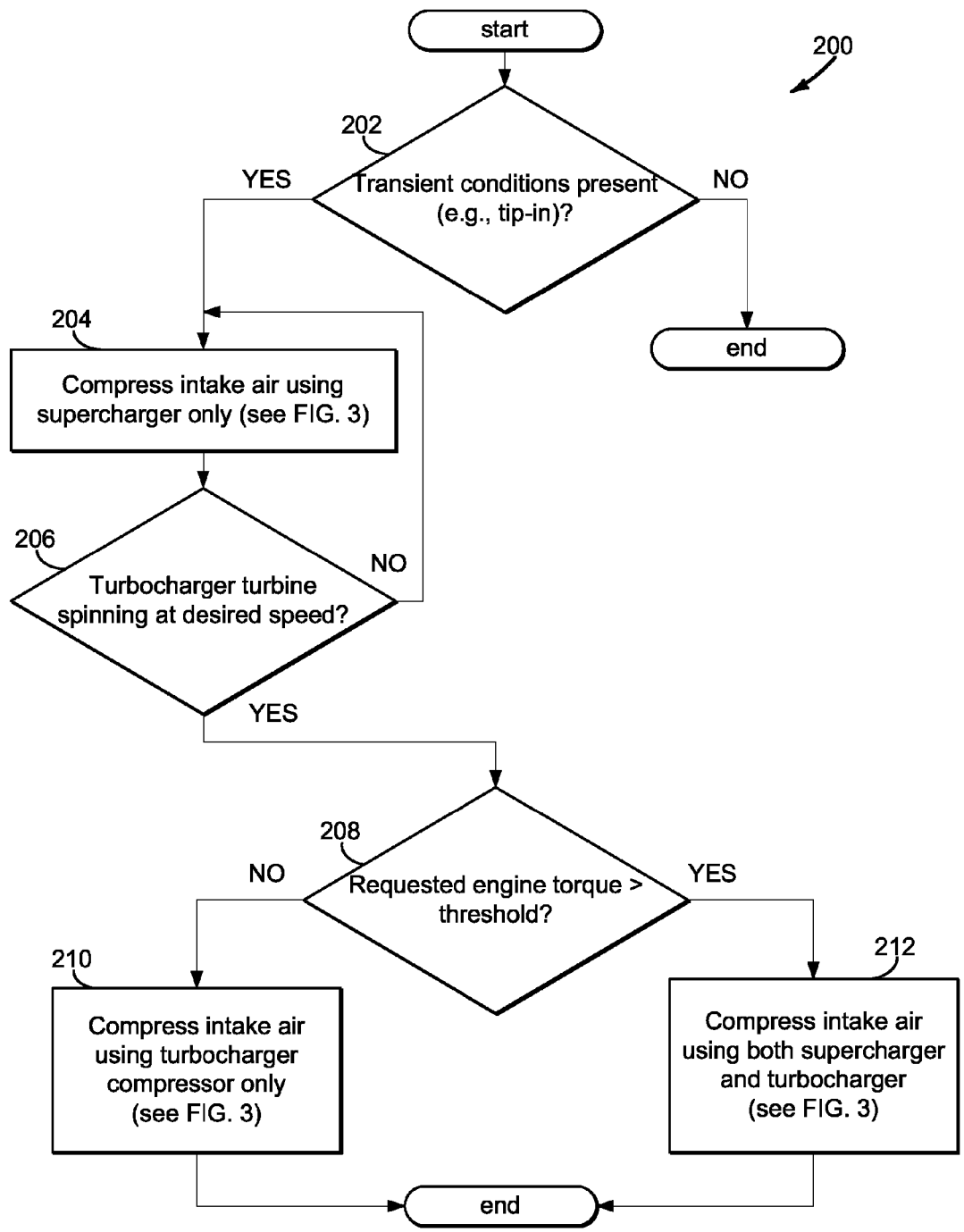
FIG. 2 shows an example method for operating the turbocharger and supercharger based on the presence of transient conditions and requested engine torque.

FIG. 2 shows an example method 200 for operating a turbocharger and supercharger based on the presence of transient conditions and requested engine torque. FIG. 2 may be used in conjunction with the engine of FIG. 1, for example.

At 202, method 200 includes determining whether transient conditions are present. The transient conditions may include driver tip-in and engine cold start, for example. During such transient conditions, the turbocharger compressor alone may not provide sufficient boost. However, it may be desirable to provide boost via the turbocharger compressor alone once steady-state conditions are achieved, in order to decouple the supercharger from the engine via the electrically-controlled clutch and thereby reduce loading on the engine.

Figure 3:
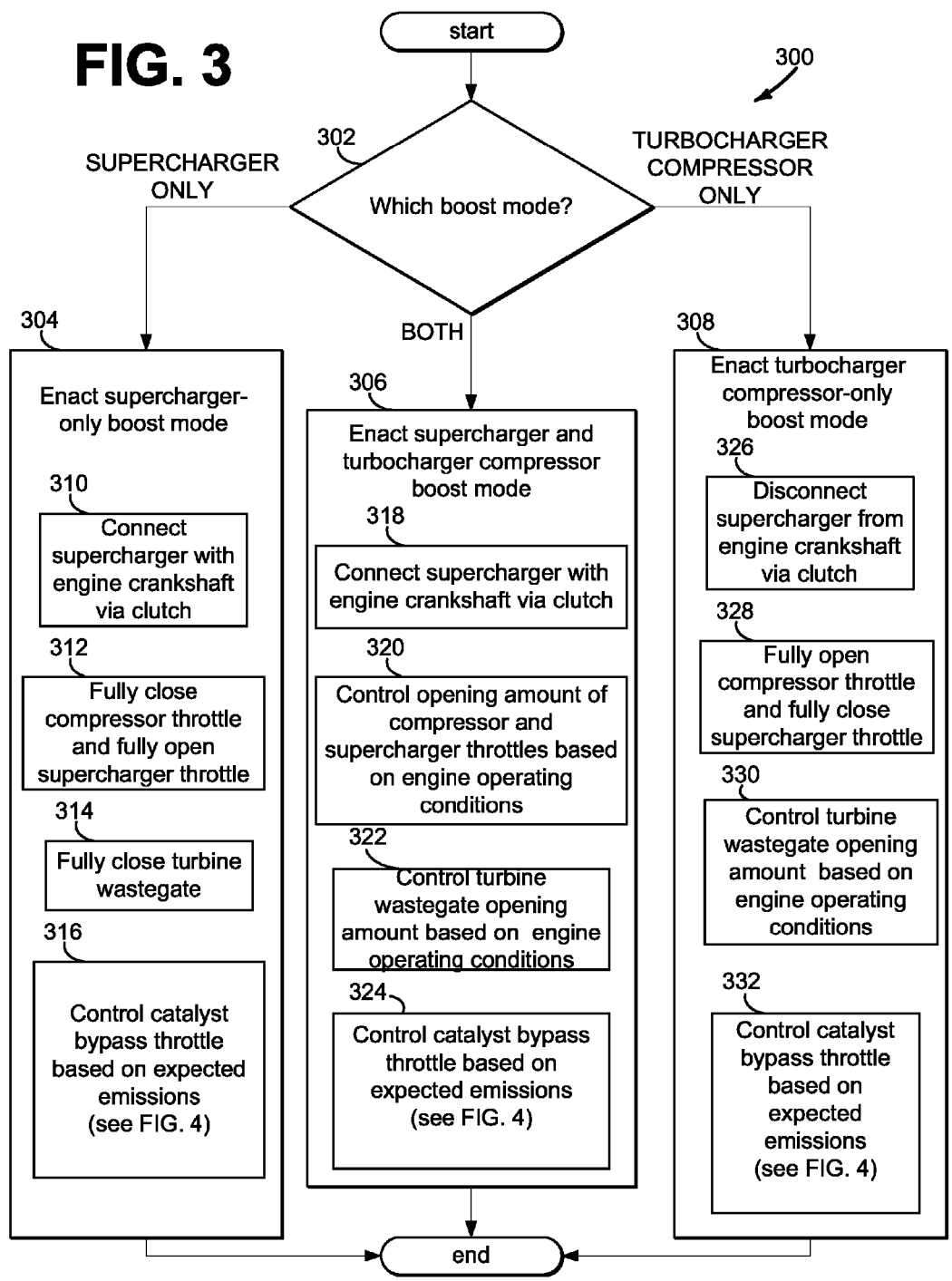
FIG. 3 shows an example method for enacting various boost modes.

If transient conditions are present, the answer at 202 is YES and method 200 continues to 204. At 204, method 200 includes compressing intake air using the supercharger only. An example method for enacting step 204 is shown in FIG. 3 and described below. By compressing intake air using the supercharger only, the turbocharger compressor meets with less resistance, which assists the turbocharger turbine in quickly spinning up to a desired speed so that a desired level of boost may ultimately be provided by the turbocharger alone.

After switching to the supercharger-only boost mode, method 200 continues to 206. At 206, method 200 includes determining whether the turbocharger turbine is spinning at a desired speed. As one example, the desired speed may be a speed at which the turbocharger compressor provides an amount of boost which will achieve a driver-requested torque.

If the answer at 206 is NO, method 200 returns to 204 to continue compressing intake air using the supercharger to give the turbocharger more time to spin up to the desired speed. Otherwise, if the answer at 206 is YES, method 200 continues to 208.

At 208, method 200 includes determining whether a requested engine torque is greater than a threshold. As one example, the threshold may correspond to an amount of engine torque which cannot be achieved via boost from either the supercharger or the turbocharger compressor alone.

If the answer at 208 is NO, method 200 continues to 210. At 210, method 200 includes compressing intake air using the turbocharger compressor only. An example method for enacting step 210 is shown in FIG. 3 and described below. By using the turbocharger compressor only to provide boost when requested torque is at level which allows such operation, the supercharger may advantageously be decoupled from the engine crankshaft via the electrically-controlled clutch so as to reduce loading of the engine.

Otherwise, if the answer at 208 is YES, method 200 continues to 212. At 212, method 200 includes compressing intake air using both the supercharger and the turbocharger compressor. An example method for enacting step 212 is shown in FIG. 3 and described below. When requested engine torque exceeds the threshold, both the supercharger and turbocharger compressor may provide boost to the engine. During such operation, the boost provided by the supercharger combats the lag which may occur during turbocharger-compressor alone boost conditions, and the boost provided by the turbocharger reduces the demands on the supercharger and thereby reduces loading of the engine and/or energy usage, depending on how the supercharger is powered.

Returning to 202, if transient conditions are not present, the answer is NO and method 200 ends.

FIG. 3 shows an example method 300 for enacting three boost modes. The method of FIG. 3 may be used in conjunction with the engine depicted in FIG. 1 and the method of FIG. 2, for example. The method of FIG. 2 may be used to determine which boost mode is appropriate during a given engine operating condition, and the method of FIG. 3 may be used to enact that boost mode. It will be appreciated that in some examples, the boost modes may overlap, and the overlap may be dynamically controlled to allow for power train calibration to optimize performance feel and fuel economy.

At 302, method 300 includes determining which boost mode to enact, for example by carrying out the method of claim 200.

If a supercharger-only boost mode is selected, method 300 continues from 302 to 304. At 304, the supercharger-only boost mode is enacted. This includes, at 310, connecting the supercharger with the crankshaft of the engine via a clutch. The clutch may be an electrically-controlled clutch such as clutch 174 depicted in FIG. 1. In this case, the controller 112 may send a signal to electrically-controlled clutch 174 which causes the clutch to connect the supercharger with the crankshaft, if the supercharger and crankshaft are not already connected via the clutch. In this way, a compressor of the supercharger may be driven by the engine crankshaft. In other non-limiting examples, the compressor of the supercharger may be driven by an electric motor powered by a battery in addition to the crankshaft, or by an electric motor alone.

Enacting the supercharger-only boost mode further includes, at 312, fully closing the compressor throttle and fully opening the supercharger throttle. As shown in FIG. 1, compressor throttle 136 may be arranged downstream of turbocharger compressor 128, and a supercharger throttle 126 may be arranged downstream of supercharger 104. By fully closing the compressor throttle and fully opening the supercharger throttle, intake air is directed from first intake passage 116 into supercharger passage 122 and not into compressor passage 124.

At 314, enacting the supercharger-only boost mode further includes fully closing the turbine wastegate. As shown in FIG. 1, turbine wastegate 168 may be arranged in turbine bypass passage 166. Fully closing the turbine wastegate serves to close the turbine bypass passage which causes all exhaust in the first plenum to flow through turbine 142. By flowing all exhaust in the first plenum through the turbine during the supercharger-only boost mode, a desired turbine speed may be achieved more quickly, for example so that the turbocharger may be used alone or in conjunction with the supercharger to provide boost to the engine.

Figure 4:
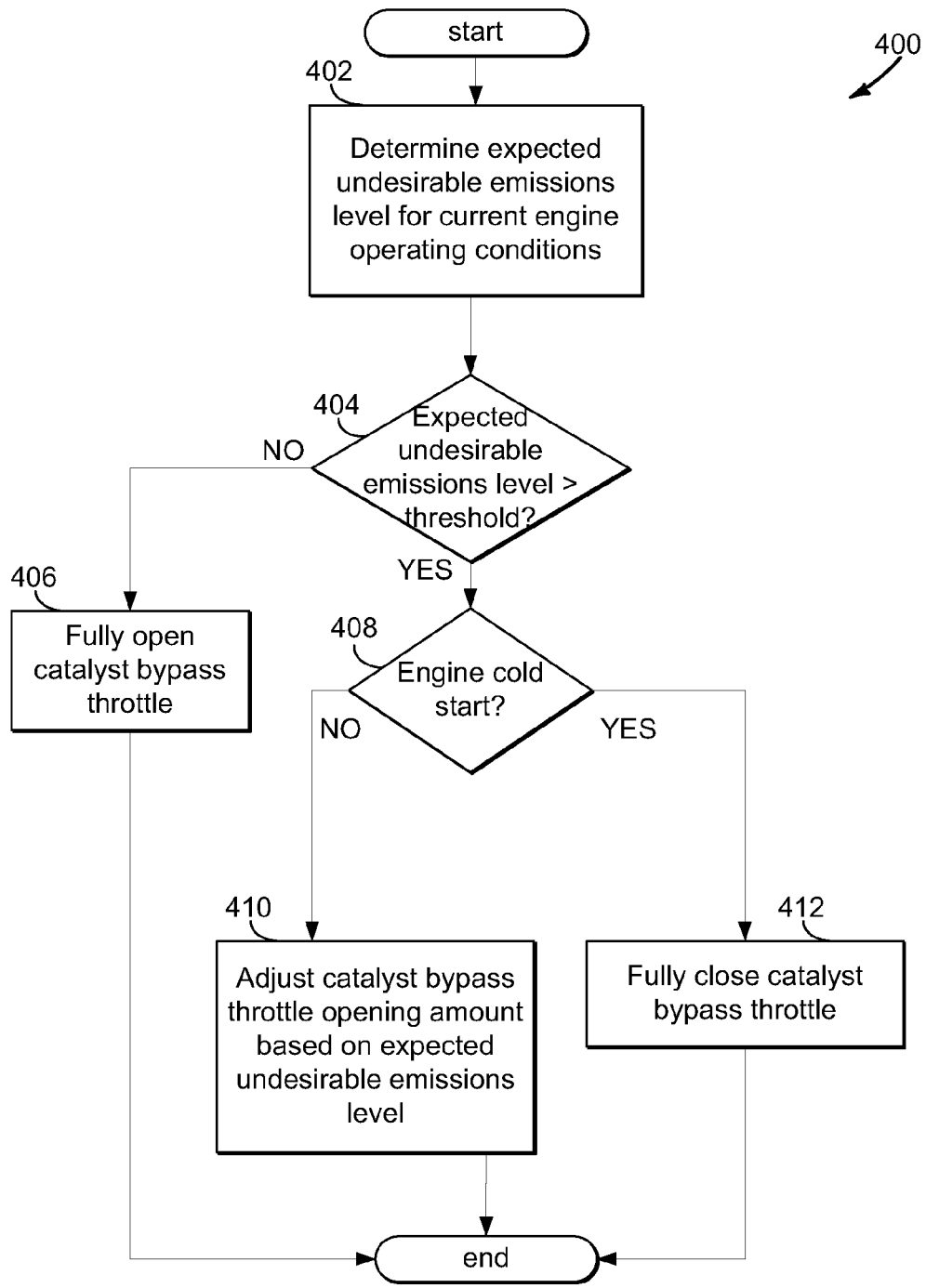
FIG. 4 shows an example method for controlling a catalyst bypass throttle based on a level of expected undesirable engine emissions.

At 316, enacting the supercharger-only boost mode further includes controlling the catalyst bypass throttle based on expected engine emissions. An example method for controlling the catalyst bypass throttle based on expected engine emissions is shown in FIG. 4 and described below.

Returning to 302, if a supercharger and turbocharger compressor boost mode is selected, method 300 continues from 302 to 306.

At 306, the supercharger and turbocharger compressor boost mode is enacted. This includes, at 318, connecting the supercharger with the crankshaft of the engine via a clutch, as described above for 310.

Enacting the supercharger and turbocharger compressor boost mode further includes, at 320, controlling an opening amount of the turbocharger compressor and supercharger throttles based on engine operating conditions. As shown in FIG. 1, compressor throttle 136 may be arranged downstream of turbocharger compressor 128, and a supercharger throttle 126 may be arranged downstream of supercharger 104. An opening amount of the supercharger throttle, in addition to other factors such as a compressor speed of the supercharger compressor, affects the proportion of the intake air in first intake passage 116 which will flow in supercharger passage 122. Similarly, an opening amount of the turbocharger compressor throttle, in addition to other factors such as a speed of the turbocharger compressor, affects the proportion of the intake air in first intake passage 116 which will flow in compressor passage 124. Various engine operating conditions may influence the desired opening amount of the turbocharger compressor and supercharger throttles. For example, the desired opening amounts of the turbocharger compressor and supercharger throttles, respectively, may be amounts which, when combined, lead to a boost level which provides a requested engine torque. As another example, the desired opening amount of the turbocharger compressor throttle may be influenced by a current turbine speed, and/or a likelihood of compressor surge at various compressor throttle opening amounts at a current turbine speed.

At 322, enacting the supercharger and turbocharger compressor boost mode further includes controlling the turbine wastegate opening amount based on operating conditions. As shown in FIG. 1, turbine wastegate 168 may be arranged in turbine bypass passage 166. A proportion of exhaust in first plenum 156 which bypasses turbine 142 by flowing through turbine bypass passage 166 may depend on an opening amount of turbine wastegate 168. As the amount of exhaust flowing through the turbine affects the speed of the turbine, by controlling the turbine wastegate opening amount, a desired turbine speed may be achieved. The desired turbine speed may be based on engine operating conditions. For example, during conditions where compressor surge is imminent but the supercharger alone cannot provide enough boost to meet a requested engine output torque, the turbine wastegate opening amount may be slightly increased to reduce turbine speed to some extent while still providing some boost via the turbocharger compressor.

At 324, enacting the supercharger and turbocharger compressor boost mode further includes controlling the catalyst bypass throttle based on expected engine emissions. An example method for controlling the catalyst bypass throttle based on expected engine emissions is shown in FIG. 4 and described below.

Returning to 302, if a turbocharger compressor-only boost mode is selected, method 300 continues from 302 to 308.

At 308, the turbocharger compressor-only boost mode is enacted. This includes, at 326, disconnecting the supercharger from the crankshaft of the engine via a clutch, as the supercharger may not need to be driven by the engine during the turbocharger compressor-only boost mode. The clutch may be an electrically-controlled clutch such as clutch 174 depicted in FIG. 1. In this case, the controller 112 may send a signal to electrically-controlled clutch 174 which causes the clutch to disconnect the supercharger from the crankshaft, if the clutch and supercharger are currently connected to the crankshaft via the clutch. In another example, the compressor of the supercharger may be driven by an electric motor rather than by the engine, in which case other steps would be taken so that the supercharger is not driven during the turbocharger-only boost mode.

Enacting the turbocharger compressor-only boost mode further includes, at 328, fully opening the compressor throttle and fully closing the supercharger throttle. As shown in FIG. 1, compressor throttle 136 may be arranged downstream of turbocharger compressor 128, and a supercharger throttle 126 may be arranged downstream of supercharger 104. By fully opening the compressor throttle and fully closing the supercharger throttle, intake air is directed from first intake passage 116 into compressor passage 124 and not into supercharger passage 122.

At 330, enacting the turbocharger compressor-only boost mode further includes controlling the turbine wastegate opening amount based on operating conditions, in the same manner described above for 322.

At 332, enacting the turbocharger compressor-only boost mode further includes controlling the catalyst bypass throttle based on expected engine emissions. An example method for controlling the catalyst bypass throttle based on expected engine emissions is shown in FIG. 4 and described below.

FIG. 4 shows an example method 400 for controlling a catalyst bypass throttle based on a level of expected undesirable engine emissions. The method of FIG. 4 may be used with the engine depicted in FIG. 1 and may be carried out in conjunction the methods shown in FIGS. 2 and 3.

At 402, method 400 includes determining an expected undesirable emissions level for current engine operating conditions. For example, various sensors 196 may be arranged at various points in the intake and exhaust systems to measure values of parameters such as intake air-fuel ratio, intake air/exhaust temperature, exhaust gas NOx content, etc. The values measured by these sensors may be sent to controller 112, and controller 112 may determine the expected undesirable emissions level based on the sensed values, among other factors.

At 404, method 400 includes determining whether the expected undesirable emissions level is greater than a threshold. The threshold may be a level at which undesirable engine exhaust emissions will exceed a permitted amount if they are treated by the underbody catalyst alone. The permitted amount may be a government-sanctioned amount, or may be associated with an emissions rating of the engine, for example.

If the answer at 404 is NO, undesirable engine exhaust emissions may be treated by the underbody catalyst alone, without exceeding the permitted amount. In this case, method 400 continues from 404 to 406 to fully open the catalyst bypass throttle. For example, controller 112 may send a signal to catalyst bypass throttle which causes the throttle to fully open. Fully opening the catalyst bypass throttle may cause the exhaust from both the first and second plenums to bypass close-coupled catalyst 162 by flowing through the unobstructed catalyst bypass passage 170. The exhaust in the first plenum may flow through turbine 142 and/or turbine bypass passage 166 (depending on an opening amount of turbine wastegate 168), and then into turbine outlet passage 160. A flow resistance at an inlet of close-coupled catalyst 162 may be higher than a flow resistance at an inlet of catalyst bypass passage 170. Due to the lower flow resistance at the inlet of the catalyst bypass passage, most or all of the exhaust in the turbine outlet passage from the first plenum may flow through the catalyst bypass passage, thereby bypassing the close-coupled catalyst. Similarly, most or all of the exhaust in second plenum 158 may be diverted into turbine outlet passage 160 and then into catalyst bypass passage 170 due to the lower flow resistance at the inlet of the catalyst bypass passage (relative to the flow resistance at the inlet of the close-coupled catalyst). Bypassing the close-coupled catalyst during conditions where it will not cause undesirable exhaust emissions to exceed a permitted level, for example, may advantageously reduce a frequency at which regeneration of the close-coupled catalyst is required. After 406, method 400 ends.

Otherwise, if the answer at 404 is YES, method 400 continues from 404 to 408 to determine whether an engine cold start is in progress. During an engine cold start, a high level of undesirable exhaust emissions may be expected. Further, during an engine cold start, exhaust catalysts may be at a temperature below a light-off temperature, which may reduce the catalysts' ability to reduce undesirable exhaust emissions.

If the answer at 408 is YES, method 400 continues to 412 to fully close the catalyst bypass throttle. For example, controller 112 may send a signal to catalyst bypass throttle which causes the throttle to fully close. Fully closing the catalyst bypass throttle may cause all of the exhaust from the first and second plenums to flow through close-coupled catalyst 162 before flowing through underbody catalyst 164. Such operation may advantageously expedite attainment of light-off temperature at the close-coupled catalyst. Further, even before the close-coupled catalyst has reached its light-off temperature, it may be able to treat undesirable exhaust emissions to some extent depending on the type of catalyst. Accordingly, flowing exhaust through the close-coupled catalyst even before it has reached light-off temperature may be preferable to bypassing the catalyst during cold start conditions when exhaust emissions are relatively high. After 412, method 400 ends.

Otherwise, if the answer at 408 is NO and an engine cold start is not in progress, method 400 continues to 410 to adjust the catalyst bypass throttle opening amount based on the expected undesirable emissions level. Because the highest undesirable emissions levels may occur during engine cold start, during other conditions it may be possible to allow at least some exhaust to bypass the close-coupled catalyst, thereby reducing the frequency it will need to be regenerated. Accordingly, based on the expected undesirable emissions level determined at 402, controller 112 may determine a maximum opening amount for the catalyst bypass throttle which will ensure that a permitted undesirable emissions amount is not exceeded while at the same time minimizing exhaust flow through the close-coupled catalyst. After 410, method 400 ends.

Figure 5:
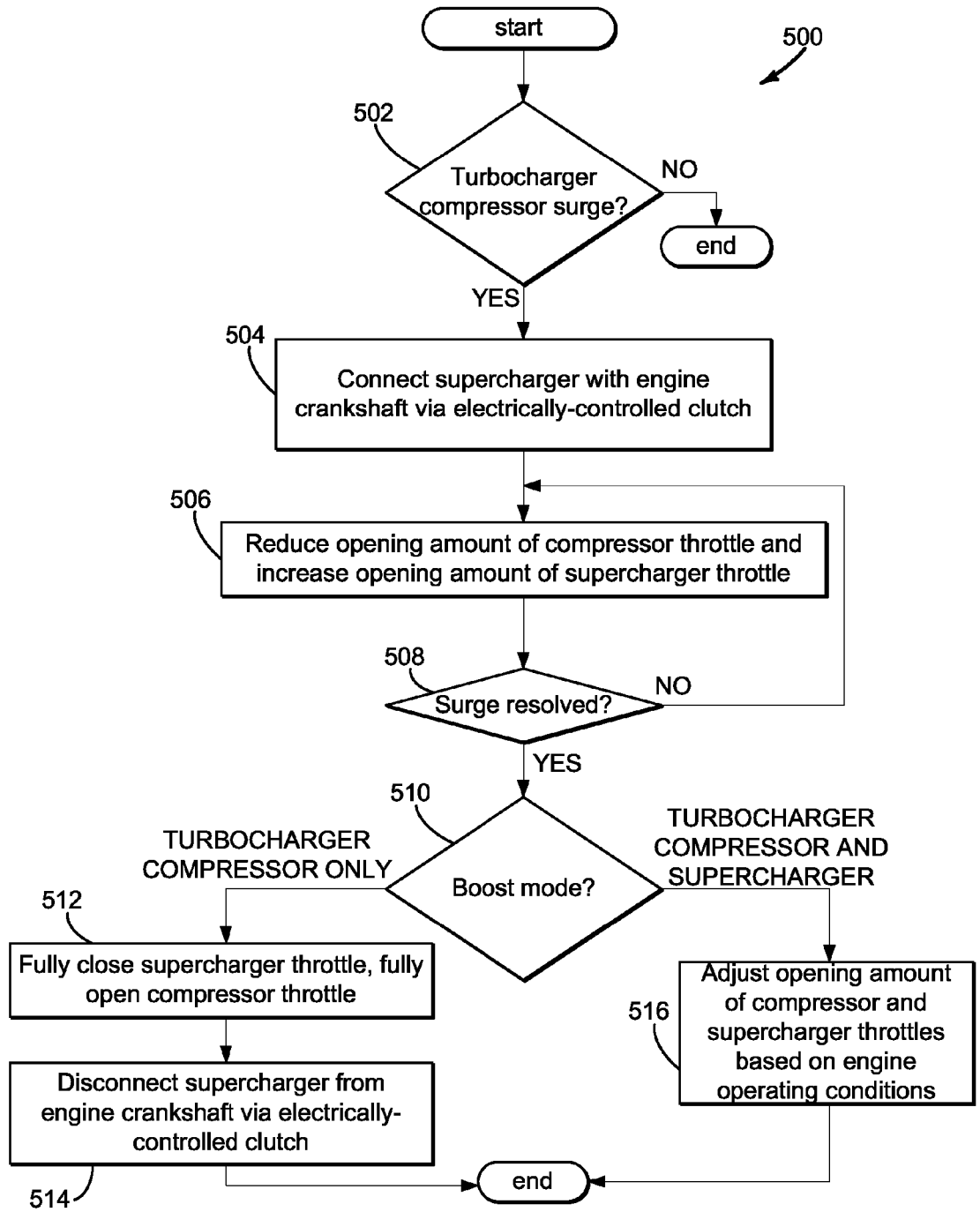
FIG. 5 shows an example method for controlling the engine to resolve surge conditions.

FIG. 5 shows an example method 500 for controlling the turbocharger and supercharger to resolve turbocharger compressor surge conditions. Turbocharger compressor surge is an undesirable condition which may occur when a high compressor speed results in more air being compressed than the engine can intake at a given time. The high pressure at the compressor outlet may forcibly reduce compressor speed, and thereby reduce turbine speed. As the engine processes the compressed intake air, turbine speed may increase again, and the corresponding increase in compressor speed may repeat the surge condition. Thus, in the absence of changes in engine operating conditions, for example, the surge conditions may persist as the turbocharger shaft speed alternates between fast and slow repeatedly. Method 500 takes advantage of the presence of both a supercharger and a turbocharger in engine system 100 in order to resolve such undesirable surge conditions.

At 502, method 500 includes determining whether turbocharger compressor surge is occurring. For example, controller 112 may make the determination based on sensed values of parameters such as turbocharger shaft speed, pressure in compressor passage 124 downstream of compressor 128, etc. over a period of time.

If the answer at 502 is NO, turbocharger compressor surge is not occurring, and method 500 ends. Otherwise, if the answer at 502 is YES, method 500 continues to 504. At 504, method 500 includes connecting the supercharger with the engine crankshaft via an electrically-controlled clutch. As described above for FIG. 3 at 310 and 318, connecting the supercharger with the engine crankshaft may cause the engine to drive a compressor of the supercharger, and the driven compressor may provide boost to the engine. It will be appreciated that if the supercharger is already connected with the engine crankshaft, for example during the turbocharger compressor and supercharger boost mode, no action may be taken at 504.

After 504, method 500 continues to 506. At 506, method 500 includes reducing an opening amount of the compressor throttle and increasing an opening amount of the supercharger throttle. For example, an amount by which the compressor throttle opening amount is reduced and an amount by which the supercharger throttle opening amount is increased may be based on sensed parameter values related to the current surge conditions and/or on other engine operating conditions. Reducing the opening amount of the compressor throttle may cause less air to flow through compressor 128, which may help to alleviate compressor surge. Further, increasing the opening amount of the supercharger throttle may increase an amount of air flowing through supercharger 104, such that the reduced amount of air flowing through the turbocharger compressor does not negatively impact the delivery of a desired level of boost to the engine. As one example, if the engine is operating in the turbocharger compressor-only boost mode when surge is detected, the supercharger throttle may be fully closed until its opening amount is increased at 506. As another example, if the engine is operating in the turbocharger compressor and supercharger boost mode when surge is detected, the supercharger throttle may already be partially open when its opening amount is increased at 506.

After 506, method 500 continues to 508 to determine whether the compressor surge has been resolved. This determination may be similar to the initial determination of the occurrence of compressor surge. If it is determined that the surge has not been resolved, method 500 returns to step 506 to further reduce the opening amount of the compressor throttle and further increase the opening amount of the supercharger throttle. In this way, the amount of air flowing through the turbocharger compressor may be further reduced in an attempt to alleviate the compressor surge, while the amount of air flowing through the supercharger is further increased to avoid fluctuations in the provision of intake air boost which may affect engine output torque. In another non-limiting example, controller 112 may take additional actions to reduce compressor surge, such as decreasing an opening amount of first throttle 118 to decrease an overall amount of intake air flow.

If surge has been resolved, however, the answer at 508 is YES, and method 500 continues from 508 to 510 to determine the current boost mode. For example, the current boost mode may be stored in memory in control system 194. The stored values may have been determined prior to the execution of method 500 based on sensed values of parameters such as compressor throttle opening amount, supercharger throttle opening amount, and a connection state of a clutch such as electrically-controlled clutch 174 shown in FIG. 1.

If the current boost mode is the turbocharger compressor-only boost mode, method 500 continues to 512. At 512, method 500 includes fully closing the supercharger throttle and fully opening the compressor throttle. After 512, method 500 continues to 514 to disconnect the supercharger from the engine crankshaft via the electrically-controlled clutch. These actions may restore the turbocharger compressor-only boost mode by removing the supercharger from the boost circuit. Depending on the power source of the supercharger, 514 may include other actions such as stopping an electric motor driving the supercharger. After 514, method 500 ends.

Otherwise, if the current boost mode is the turbocharger compressor and supercharger boost mode, method 500 continues to 516. At 516, method 500 includes adjusting the opening amount of the compressor and supercharger throttles based on engine operating conditions. For example, the opening amounts of the throttles may be restored to the opening amounts of the throttles before the execution of method 500. For example, prior to execution of method 500, controller 112 may store such information in memory of control system 194, and may access this information at 516 so as to restore the previous state of the throttles. Accordingly, the throttle opening amounts may be temporarily adjusted to reduce compressor surge, and then may be restored once the surge has been resolved. After 516, method 500 ends.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an engine, comprising:
   during a transient condition, defined as speed of the turbine being below a threshold, increasing opening of a first throttle downstream of a supercharger driven by an engine crankshaft and supplying air to each cylinder in the engine, the supercharger in parallel with a compressor driven by a turbocharger turbine receiving exhaust flow from only a subset of engine cylinders, while decreasing opening of a second throttle downstream of the compressor; and
   during a steady-state condition, defined as the speed of the turbine being above the threshold, adjusting opening of the first and second throttles based on engine operating conditions.

2. The method of claim 1, wherein the engine cylinders are inline cylinders of an engine block, and wherein the subset of engine cylinders comprises only inner cylinders of the engine block.

3. The method of claim 2, further comprising directing all exhaust flow from the inner cylinders in a first plenum of an integrated exhaust manifold (IEM) and directing all exhaust flow from other cylinders of the engine block in a second plenum of the IEM, wherein the first and second plenums do not communicate within the IEM, and wherein the turbine does not receive exhaust flow from the second plenum.

4. The method of claim 2, wherein adjusting opening of the first and second throttles during the steady-state condition further comprises:
   if a driver-requested torque exceeds a threshold, increasing opening of the second throttle and adjusting opening of the first throttle; and
   if the driver-requested torque does not exceed the threshold, increasing opening of the second throttle, closing the first throttle, and decoupling the supercharger from the crankshaft of the engine via a clutch.

5. The method of claim 2 further comprising, during a compressor surge condition:
   coupling the supercharger with the crankshaft of the engine via a clutch; and
   decreasing opening of the second throttle while increasing opening of the first throttle.

6. A method of controlling an engine, comprising:
   directing exhaust from only a first subset of cylinders to a turbine of a turbocharger via an integrated exhaust manifold (IEM);
   directing exhaust from only a second subset of cylinders to bypass the turbine via the IEM;
   compressing intake air via at least one of a supercharger driven by an engine crankshaft and a compressor of the turbocharger, each of the supercharger and the compressor supplying air to the first and second subsets of cylinders;
   during a transient condition when a speed of the turbine is below a threshold, directing intake air flow to the supercharger and not to the compressor via opening a throttle valve being downstream of the supercharger and closing a throttle valve downstream of the compressor;
   during a steady-state condition when the speed of the turbine is above the threshold and a requested driver torque is above a threshold, directing the intake air flow to the supercharger and the compressor via opening the throttle downstream of the supercharger and opening the throttle valve downstream of the compressor; and
   during a steady-state condition when the speed of the turbine is above the threshold and the requested driver torque is below the threshold, directing the intake air flow to the compressor and not to the supercharger via opening the throttle valve downstream of the compressor and closing the throttle valve downstream of the supercharger.

7. The method of claim 6, wherein directing exhaust from only the first subset of cylinders to the turbine via the IEM comprises directing the exhaust in a first plenum connecting exhaust runners of only the first subset of cylinders to the turbine.

8. The method of claim 7, wherein directing exhaust from only the second subset of cylinders to bypass the turbine via the IEM comprises directing the exhaust in a second plenum connecting exhaust runners of only the second subset of cylinders with ambient, wherein the first and second plenums do not communicate upstream of the turbine.

9. The method of claim 8, wherein an outlet of the turbine combines with the second plenum upstream of a close-coupled catalyst.

10. The method of claim 9, further comprising firing the cylinders of the second subset before firing the cylinders of the first subset and continuing to fire the cylinders in this order during operation of the engine, wherein the first subset of cylinders are inner cylinders of an engine block of the engine and the second subset of cylinders are outer cylinders of the engine block.

11. The method of claim 1, wherein the transient condition is a driver tip-in.

12. An engine system, comprising:
an integrated exhaust manifold (IEM);
an inline group of two inner cylinders flanked by two outer cylinders, each cylinder communicating with only one of four exhaust runners of the IEM, the exhaust runners of the inner cylinders merging into a first plenum and the exhaust runners of the outer cylinders merging into a second plenum;
a turbocharger with a turbine, an inlet of the turbine communicating with the first plenum but not the second plenum; and
a supercharger arranged in parallel with a compressor of the turbocharger upstream of an engine intake manifold.

13. The engine system of claim 12, wherein the first and second plenums are the only exhaust outlets of the IEM and do not fluidly communicate with each other within the IEM.

14. The engine system of claim 13, further comprising a clutch releasably connected to a crankshaft of the engine and the supercharger.

15. The engine system of claim 14, wherein an intercooler is disposed in a passage upstream of the intake manifold and downstream of the parallel supercharger and compressor.

16. The engine system of claim 15, further comprising an outlet of the turbine communicating with the second plenum upstream of a close-coupled catalyst.

17. The engine system of claim 16, further comprising a turbine bypass passage coupling the turbine inlet with the turbine outlet and a wastegate arranged in the turbine bypass passage.

18. The engine system of claim 17, further comprising a first EGR passage coupling the second plenum with an inlet of the compressor, a second EGR passage coupling the turbine outlet with the inlet of the compressor, and a third EGR passage coupling the turbine inlet with an outlet of the compressor.

* * * * *